M. HABISREITINGER.
WATER CLOSET HIGH PRESSURE BALL COCK.
APPLICATION FILED JULY 1, 1918.
1,299,708.
Patented Apr. 8, 1919
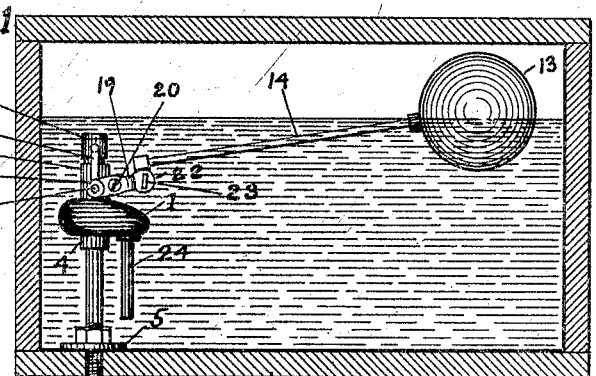
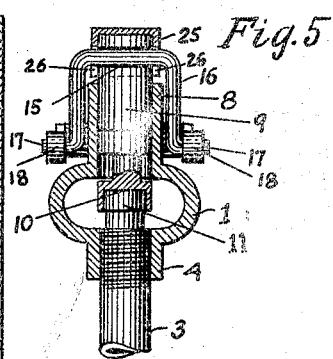
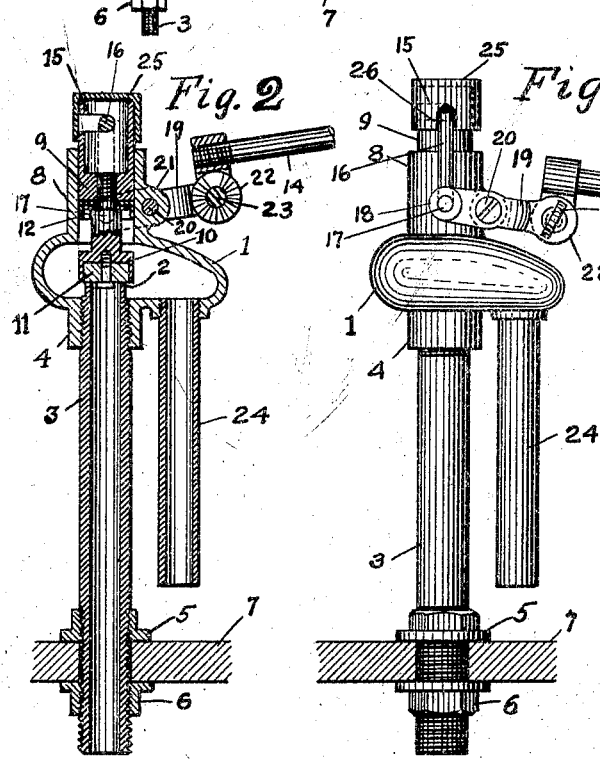
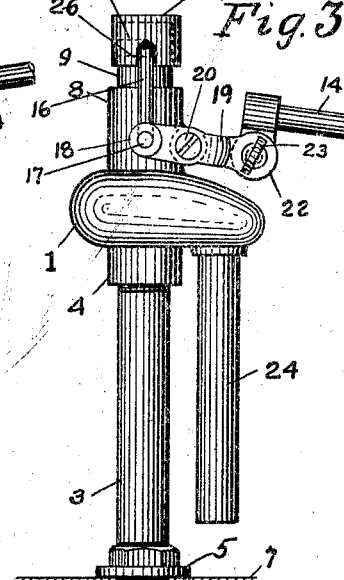
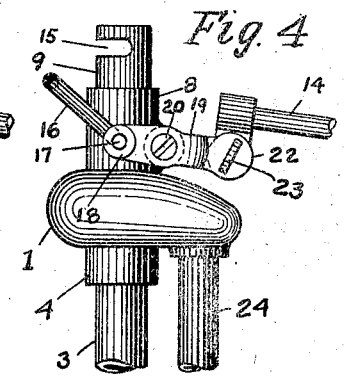
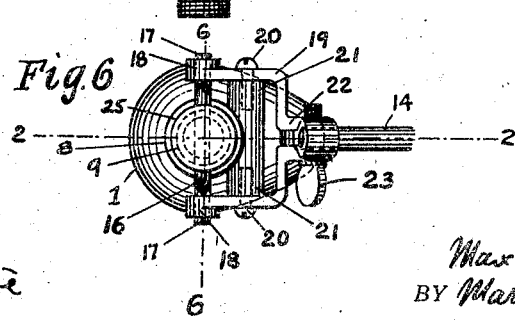
WITNESSES:
Fannie Lewi
H. Johnson
INVENTOR.
Max Habisreitinger
BY Marcus S. Leile
ATTORNEYS.

UNITED STATES PATENT OFFICE.

MAX HABISREITINGER, OF OAKLAND, CALIFORNIA.

WATER-CLOSET HIGH-PRESSURE BALL-COCK.

1,299,708. Specification of Letters Patent. Patented Apr. 8, 1919.

Application filed July 1, 1918. Serial No. 242,872.

*To all whom it may concern:*

Be it known that I, MAX HABISREITINGER, a citizen of the United States, residing at Oakland, in the county of Alameda and State of California, have invented a new and useful Improvement in Water-Closet High-Pressure Ball-Cocks, of which the following is a specification.

My invention relates to improvements in high pressure ball cocks, which control the supply of water to the water tanks generally used on water closets, and the object of my invention is to formulate the valve in such a way, as to have the working parts, which are most subject to wear, readily accessible, and the valve stem carrying the rubber washer, which deteriorates so readily, easily removable.

The construction and manner of operation of the valve are fully described in this specification and are illustrated in the accompanying drawings which form part thereof and in which Figure 1 is a longitudinal section through the water tank, showing the valve in place.

Fig. 2 is a section through the center of the valve taken on line 2—2 of Fig. 6, showing the interior parts in the position when the valve is closed.

Fig. 3, is a side elevation of the valve, the parts being shown in the position when the valve is open.

Fig. 4 is a side elevation of the valve, the inlet and the outlet pipes being broken away and the locking cap removed.

Fig. 5 is a section through the center of the valve, taken on line 5—5 of Fig. 6, and Fig. 6 is a plan view of the valve.

The valve of my invention consists of the hollow valve body 1, formed with a lower boss 4, bored and threaded to receive the end of the inlet pipe 3, the upper end of which forms the valve seat 2, and the lower end, which is provided with a screw thread, is furnished with the threaded fittings 5 and 6, whereby the valve becomes secured to the bottom of the water tank 7.

A boss 8 is provided on the upper side of the valve body in alinement with th inlet pipe 3, the said boss being bored smooth, in order to receive the valve stem 9.

The valve stem is free to move up and down within the smooth bore of the boss 8, and carries a cup leather 12, which prevents the water from leaking.

The valve stem is provided at its bottom with a cavity 10 within which a rubber washer 11 is fitted, and at the top it is furnished with a recess 15, within which a U-shaped connecting rod 16 is made to fit with its middle portion, while the free ends 17 of said rod engage the ends 18 of a bifurcated lever 19, which is formed in two halves and is pivoted by means of the pivoting screws 20 to the bosses 21 provided upon the valve body 1.

A cap 25 formed with the recesses 26 is placed over the top of the valve stem 9, the said recesses receiving the middle portion of the U-shaped connecting rod, retaining it in place.

A float arm 14 carrying at one end a float 13, is secured at the other end to the outer arm 22 of the lever 19, by means of the thumb screw 23.

The swinging motion of the float arm 14 together with the lever 19 around the pivoting screws 20, due to the rise and fall of the water level within the water tank 7 is transmitted to the valve stem by means of the U-shaped connecting rod, the rising of the float arm 14 causing the lowering of the valve stem upon the valve seat 2, while the lowering of the float arm causing the rising of the valve stem off the seat, thus admitting water into the interior of the valve body and discharging it into the water tank through the pipe 24.

When it is desired to remove the valve stem 9, in order to renew the rubber washer 11, the locking cap 25 is first lifted off the top of the valve stem and the middle portion of the U-shaped connecting rod 16 is withdrawn from the recess 15 and is swung around the pivoting points 17 to the position shown in Fig. 4.

The valve stem 9 is then lifted out, and after the worn rubber washer has been replaced, it is returned into place and the connecting rod is again brought in engagement with the recess 15 and locked in place by placing the locking cap back upon the top of the valve stem.

The connection of the middle portion of the U-shaped connecting rod 16 with the stem 9 is made without the use of screw threads, which becoming corroded are liable to stick and become broken, when an attempt is made to remove them.

Having thus described my invention, what

I claim as new and desire to secure by Letters Patent is:

1. In a ball cock, a casing, a valve in the casing having a stem projecting from the casing, a float lever pivoted to the casing, and a U shaped member pivoted at the free end to said float lever and connecting removably with its intermediate portion, the said projecting stem; the said removable connection comprising a slot cut in the stem extending from the side thereof and terminating at the center, the wall of the slot engaging the said intermediate portion at the top and bottom, and a cap slidably fitting the outer end of the stem and having a slot engaging the said intermediate portion at the sides.

2. In a ball cock, a casing, a valve in the casing having a stem projecting from the casing, a float lever pivoted to the casing, and a U shaped member pivoted at the free end to said float lever and removably connecting at its intermediate portion with the said projecting stem; the said removable connection comprising a slot cut in the stem extending from the side thereof to the center, the wall of the slot engaging the said intermediate portion at the top and bottom, and removable locking means adapted to engage the said intermediate portion at the side retaining it in position at the center of the stem.

MAX HABISREITINGER.

Witnesses:
EDMUND J. KNETZGER,
JOS. FLITTNER.